United States Patent [19]

Attinger et al.

[11] Patent Number: 5,067,574
[45] Date of Patent: Nov. 26, 1991

[54] MOUNTING FOR A COOLER

[75] Inventors: Thomas Attinger; Frank Plonus, both of Stuttgart, Fed. Rep. of Germany

[73] Assignee: Mercedes-Benz AG, Fed. Rep. of Germany

[21] Appl. No.: 593,069

[22] Filed: Oct. 5, 1990

[30] Foreign Application Priority Data

Oct. 6, 1989 [DE] Fed. Rep. of Germany ....... 3933410

[51] Int. Cl.[5] .............................................. B60K 11/04
[52] U.S. Cl. ................................ 180/68.4; 123/41.57
[58] Field of Search ............................ 180/68.4, 68.6; 123/41.33, 41.57

[56] References Cited

FOREIGN PATENT DOCUMENTS 2634990 2/1978 Fed. Rep. of Germany .
3246583 4/1984 Fed. Rep. of Germany .
2184700 7/1987 United Kingdom .

Primary Examiner—Andres Kashnikow
Assistant Examiner—Richard Camby
Attorney, Agent, or Firm—Evenson, Wands, Edwards, Lenahan & McKeown

[57] ABSTRACT

A mounting for a cooler of a motor vehicle which has two journals arrangd at a distance from one another on each of its opposite narrow sides and adapted to be held in corresponding bearing bores of supporting brackets fixed to the vehicle. Each bearing bore is provided with a receiving slot for the journal; with the receiving slots for one pair of journals being offset at an angle of about 90° relative to the receiving slots for the other pair.

7 Claims, 2 Drawing Sheets

5,067,574

MOUNTING FOR A COOLER

BACKGROUND AND SUMMARY OF THE INVENTION

The present invention relates to a mounting for a cooler on a motor vehicle.

A cooler mounting is disclosed in German Offenlegungsschrift 2,634,990 in which journals are integrally formed on opposite edge zones of the cooler. These journals are introduced into rubber rings which are held in supports fixed to the vehicle. In one illustrative embodiment of the German Offenlegungsschrift, the journals integrally formed on the upper side of the cooler are introduced into corresponding bearings fixed to the vehicle and provided with rubber rings and a rubber ring attached to a bracket is then passed over the journal integrally formed on the underside of the cooler. The bracket is then screwed to the vehicle. The disadvantage of this arrangement is that, during installation, the cooler has to be held until the bracket has been connected to the vehicle.

In another illustrative embodiment of the German Offenlegungsschrift, the cooler is inserted by its journals integrally formed on its underside into corresponding rubber rings attached to a part fixed to the vehicle. On its upper side, the cooler bears journals which are arranged at an angle to the journals of the underside and, by tilting the cooler—after insertion into the lower bearing has been accomplished—are inserted into rubber rings which are arranged on a bearing fixed to the vehicle. In order to avoid tilting of the cooler during the operation of the vehicle, it must be secured. This is accomplished by fixing the cooler at it upper side via separate securing members after the insertion of the upper journals into the corresponding rubber rings.

It is therefore the object of the present invention to provide a cooler mounting of the generic type which can be installed and removed in a simple manner, and is nevertheless held secured in its installed position.

This and other objects are achieved according to the invention by a novel arrangement of the mounting bracket, and the cooperating journals on the cooler itself, as described in detail herein.

On each of its opposite narrow sides, a cooler of a motor vehicle has two journals arranged at a distance from one another. The journals carry resilient sleeves surrounding them which are accommodated in corresponding bearing bores of two supporting brackets fixed to the vehicle. Each bearing bore is provided with a receiving slot for the introduction of the journal surrounded by the resilient sleeve, the width of the receiving slot being narrower than the diameter of the associated bearing bore. The direction of the receiving slots of the two bearing bores lying in one plane in the two supports is the same and they are arranged offset at an angle of approximately 90° relative to the receiving slots of the bearing bores lying in the other plane. The cooler journals lying in one plane are inserted together with the resilient sleeves surrounding them, through the corresponding receiving slots, into the associated bearing bores and the entire cooler is then swivelled until the two journals lying in the other plane come to rest, via the corresponding receiving slots, in the respective bearing bores and the cooler thus occupies its installed position. In this position, resilient sleeves are pushed over the journals, the cooler thus being prevented from tilting out of its installed position and being held in this position. Neither additional securing means nor special mounting tools are required for this purpose.

Other objects, advantages and novel features of the present invention will become apparent from the following detailed description of the invention when considered in conjunction with the accompanying drawings.

DETAILED DESCRIPTION OF THE DRAWINGS

Figure 1:
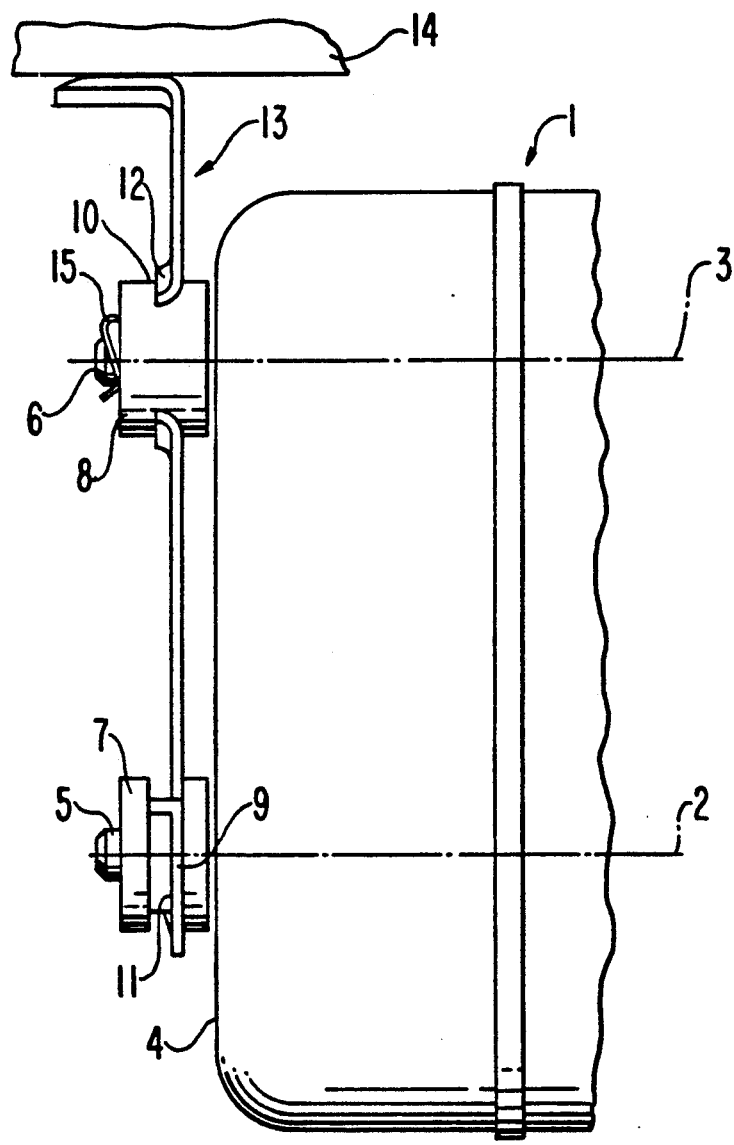
FIG. 1 shows part of a cooler with a mounting according to the invention in front view.

In FIG. 1, part of the cooler 1 of a motor vehicle, e.g., a radiator or an oil cooler, is represented in front view. The other side of the cooler and its mounting are of mirror-image construction and therefore do not need to be represented and described in more detail. Journals 5 and 6 respectively are integrally formed on the narrow side 4 of the cooler 1 in two transversely extending planes 2 and 3 intersecting a vertical axis of the cooler at different levels. Pushed onto journals 5 and 6 are sleeves 7 and 8 respectively, of resilient material, such as, for example, rubber, by which the cooler 1 is inserted into corresponding bearing bores 9 and 10 respectively, each of which has a flanged edge 11 and 12 respectively, of a support 13 fixed to the vehicle and provided on each of the two narrow sides 4 of the cooler 1. Support 13 is fixedly attached to a part 14 fixed to the vehicle in a conventional manner not shown here. The pushed-on sleeves 7 and 8 can be fixed on the corresponding journals 5 and 6 respectively—as shown by the example of journal 6—by means of a securing clip 15, also in a conventional manner.

Figure 2:
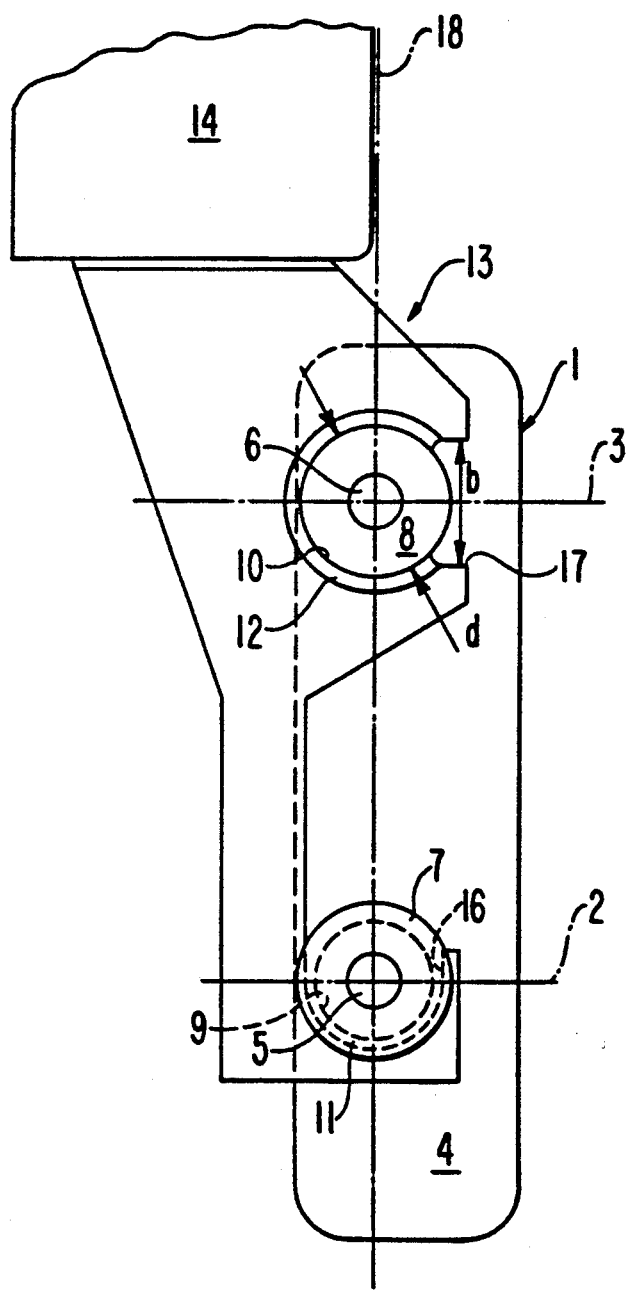
FIG. 2 shows the mounting according to the invention, in accordance with FIG. 1 and in side view.

FIG. 2 shows the cooler 1 with one of its two supports 13 in a side view. As already described for FIG. 1, the support 13 is connected to a part 14 fixed to the vehicle. Integrally formed on each narrow side 4 of the cooler 1 in the planes 2 and 3 are the journals 5 and 6 respectively, each of which carries a resilient sleeve 7 and 8, respectively, surrounding it. These sleeves 7 and 8 can simply be pushed onto the journals 5 and 6 or, for example, screwed onto the journals 5 and 6 via an internal thread arranged inside them. The fixing described in FIG. 1 by means of a securing clip is not shown here for reasons of clarity.

In the planes 2 and 3, the supporting bracket 13 has bearing bores 9 and 10 respectively, which are provided with a flanged edge 11 and 12 respectively. The installation of the cooler 1 in the vehicle is effected by inserting the cooler 1 into the bearing bore 9 from above, in a slightly tilted condition, by its journal 5 surrounded by the sleeve 7, via the upwardly opened receiving slot 16, in which bearing bore it is held resiliently. The vertical axis of the cooler 1 is then tilted into the vertical about the journal 5, with the result that the upper journal 7 is moved towards the receiving slot 17, which opens the upper bearing bore 10 towards the side of the width b of which is less than the diameter d of this bearing bore 10. The journal 6 is introduced into the upper bearing bore 10 through the receiving slot 17, whereupon the sleeve 8 is pushed on over the journal 7 from outside through the bearing bore 10. In this position, the cooler 1 is in a vertical position and is supported resiliently both by the upper and by the lower bearing and is held secured against tilting in this position. To prevent the sleeve 8 falling off the journal 6, it can be fixed by means of the already mentioned securing clip 15, not shown here.

It is evident that the arrangement of the receiving slots 16 and 17 can also be interchanged, the upwardly open receiving slot being used, with appropriate design of the support 13, as an upper bearing while the laterally open receiving slot serves with its bearing bore as lower bearing.

With this mounting, the cooler 1 is secured against tilting back and at the same time resiliently decoupled from the vehicle body. It can also be mounted and dismounted in a simple manner, even where space is restricted.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Mounting for a cooler on a motor vehicle, said cooler having first and second end surfaces at opposite narrow ends thereof, said mounting comprising:
   a first pair of journals arranged on said first end surface;
   a second pair of journals arranged on said second end surface;
   one journal of each of said first and second pairs of journals lying in a first plane, and the other journal of each of said first and second pairs of journals lying in a second plane substantially parallel to said first plane;
   a first support member fixed to said vehicle and having bearing bores corresponding to and adapted to receive and hold said first pair of journals;
   a second support member fixed to said vehicle and having bearing bores corresponding to and adapted to receive and hold said second pair of journals;
   each of said bearing bores having a receiving slot for receiving a corresponding journal, said receiving slots for receiving the journals lying in said first plane being spatially offset at an angle of about 90 degrees relative to receiving slots for receiving the journals lying in said second plane.

2. Mounting for a cooler according to claim 1, wherein said receiving slots for receiving the journals lying in said first plane are oriented substantially parallel to a vertical axis of said cooler, and said receiving slots for receiving the journals lying in said second plane are oriented substantially perpendicular to said vertical axis of the cooler.

3. Mounting for a cooler according to claim 1, wherein the width of the receiving slots in narrower than the diameter of the bearing bores.

4. Mounting for a cooler according to claim 1, wherein the journals are provided with a resilient sleeve which surrounds them.

5. Mounting for a cooler according to claim 3, wherein the journals are provided with a resilient sleeve which surrounds them.

6. Mounting for a cooler according to claim 4, wherein the resilient sleeve is fixed on the journal by a securing element.

7. Mounting for a cooler according to claim 5, wherein said receiving slots for receiving the journals lying in said first plane are oriented substantially parallel to a vertical axis of said cooler, and said receiving slots for receiving the journals lying in said second plane are oriented substantially perpendicular to said vertical axis of the cooler.

* * * * *